United States Patent

[11] 3,587,007

[72] Inventor Gabor C. Temes
Los Altos, Calif.
[21] Appl. No. 853,261
[22] Filed Aug. 27, 1969
[45] Patented June 22, 1971
[73] Assignee Ampex Corporation, Redwood City, Calif.

[54] VARIABLE SAMPLE PERIODIC HOLD ELECTRONIC DELAY NETWORK
1 Claim, 5 Drawing Figs.

[52] U.S. Cl. .......... 333/18, 333/29, 333/70 A
[51] Int. Cl. .......... H03h 7/36, H04b 3/04
[50] Field of Search .......... 178/6.6; 333/29, 7, 18, 70 A; 328/151, 155, 138; 307/293

[56] References Cited
UNITED STATES PATENTS

| | | | |
|---|---|---|---|
| 2,584,986 | 2/1952 | Clark | 328/138 |
| 2,966,641 | 12/1960 | McCoy | 333/29 |
| 3,344,262 | 9/1967 | Pryor, Jr. | 328/151 X |

*Primary Examiner*—Herman Karl Saalbach
*Assistant Examiner*—Marvin Nussbaum
*Attorney*—Robert G. Clay

ABSTRACT: To achieve a variable time delay of an information signal wherein the amount of delay can be continuously varied in response to a control signal, a plurality of paralleled sample and hold networks are arranged to receive the information signal and perform the following operations thereon. First, the magnitude of the information signal is sequentially sampled by a plurality of separate sampling gates, wherein each gate is provided with a separate storage capacitor for holding the sampled magnitude for the time interval between successive operations of the associated gates. The stored signal magnitudes are in turn sampled in succession by a plurality of separate output sampling gates wherein the resulting output signals therefrom are fed to a low-pass filter for eliminating high frequency signal components introduced by operation of the sampling gates. As the time duration between successive operations of the input and output sampling gates determines the amount of delay introduced into the information signal, a plurality of voltage controlled delay means are connected between associated sampling gates and are responsive to the instantaneous amplitude of the control signal to provide continuous adjustment of the gate timing intervals.

INVENTOR.
GABOR C. TEMES

BY Robert G. Clay

ATTORNEY

VARIABLE SAMPLE PERIODIC HOLD ELECTRONIC DELAY NETWORK

The present invention generally relates to electrical signal delay systems, and more particularly to a voltage controlled delay network suitable for time base correction in recording/reproduction systems.

A recurring problem in the art of recording and reproducing electrical signals, such as by magnetic tape, is the difficulty of maintaining a constant timing relationship between the information on the signal to be recorded or reproduced and an external reference signal of known timing characteristics. A specific example of this problem is found in the reproduce or playback mode of a tape recorder. In order to be assured that the information carried by the reproduced signal is an accurate representation of the originally recorded signal, the speed of the tape during playback must closely conform to the rate at which the information was recorded. One technique for achieving this requisite speed control is to record a timing or pilot signal along with the information signal during the record mode and to provide means operable during the playback mode for comparing the frequency of the pilot signal with that of a reference signal. A difference or error signal provided by this comparison may be used to control the speed of the tape during playback. While this scheme affords significant and substantial time base matching, there are nevertheless time base errors which escape the corrective effect of such a servocontrol. Consequently, the art has taken a still further step to eliminate second order timing errors which are not compensated for by the servomechanism, wherein the second order correction techniques employ one form or another of an electrically controlled signal delay means. With this more sophisticated technique, the reproduced information signal is fed through a delay line or network and the time based error signal derived by comparing the aforementioned prerecorded pilot signal with a reference signal is employed to continuously adjust the instantaneous delay of the line or network. By virtue of the significantly higher frequency response characteristics exhibited by the variable delay line or network, very fine time base compensation can be achieved.

While several types of variable delay lines and delay networks have been devised and successfully employed in time base correction systems, there is a continuing search to discover more economical, efficient and practical means for obtaining the delay function. For example, a variable delay line having capacitively variable diode elements is a recognized means for providing suitable delays, particularly in conjunction with transverse video recorders. However, in some video recorder applications and moreover in longitudinal recorders, the timing error becomes quite large, especially at lower tape speeds, and the variable delay line approach becomes less attractive, due to the large physical dimensions and high number of elements required.

Also, electronic variable delay networks have been employed. One known circuit of this type colorfully referred to as a "bucket brigade" delay network, comprises a serial cascade of storage capacitors, switches, and buffer amplifiers arranged to introduce a delay in the information signal by means of a predetermined operating sequence of the various switches. While the "bucket brigade" network does provide an increased time delay capability, the number of stages required and certain limitations on the fidelity of the delayed signal detract from the suitability of this technique. The above-noted variable delay schemes are described at pages 246—251 of IEEE Transaction on Military Electronics, July —Oct. 1965.

Accordingly, it is an object of the present invention to provide a variable and electrically controllable delay network suitable for use in the above-noted environment and particularly advantageous in providing substantial time delays with an efficiency not obtainable by prior approaches.

These and other objects and advantages are provided in accordance with the present invention by a sampling and hold technique having the following characteristics. The information signal to be delayed is jointly fed to a plurality of input sampling or gating means, each being operative on command to sample the instantaneous magnitude of the input signal. A corresponding plurality of storage means, such as capacitive components, is individually connected to receive and hold each sample signal magnitude for a period determined by successive operations of the associated input gating means. A further plurality of output gating means is provided, each connected to a separate storage element, and being operative or command to sample and issue to an output filter, the particular signal magnitude carried by the associated storage means. The output gating means are operated periodically and in sequence while the input gating means operate in response to a delay interval following operation of an associated output gating means. The delay interval is in turn responsive to the magnitude of the control or error signal. Accordingly, by sampling and storing the instantaneous level of the input information signal following a controlled delay interval from operation of the associated output gating means, and then issuing the stored signal magnitude to an output upon the next consecutive operation of the output gate, a controlled delay in the information signal is achieved. Moreover, as described herein, substantial time delays are provided without adversely effecting the quality or reproduction fidelity of the signal information.

The invention will be described in greater detail with reference to the accompanying drawings, forming a part of the specification, and in which.

Figure 1:
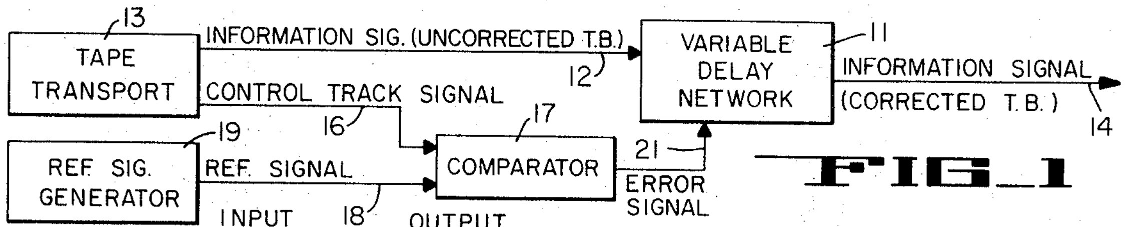
FIG. 1 is a simplified block diagram illustrating the environment within which the variable delay network of the present invention operates.

With reference to FIG. 1, variable delay network 11 (corresponding to network 11 in FIG. 2 and network 11*a* in FIG. 3) is adapted to receive an information signal over line 12 from tape transport 13 wherein such signal exhibits time base errors. The output of network 11 provides a correction of the time base by a delay operation as described herein and issues the corrected time base information signal to a line 14. In addition to the information signal provided overline 12, the tape transport also emits a control track or pilot signal over a line 16 wherein this pilot signal was previously recorded simultaneously with the information signal. A comparator 17 is provided for receiving and comparing the control track signal via line 16 and a reference signal over line 18, in this instance the reference signal being provided by generator 19. Any frequency or phase differences detected between the reference signal and the control track signal cause comparator 17 to issue an error signal overline 21 to and for continuously adjusting the amount of delay provided by network 11 and thus forcing the information signal issued overline 14 to assume a time base matching that of the reference signal.

Figures 2, 3, 4, 5:
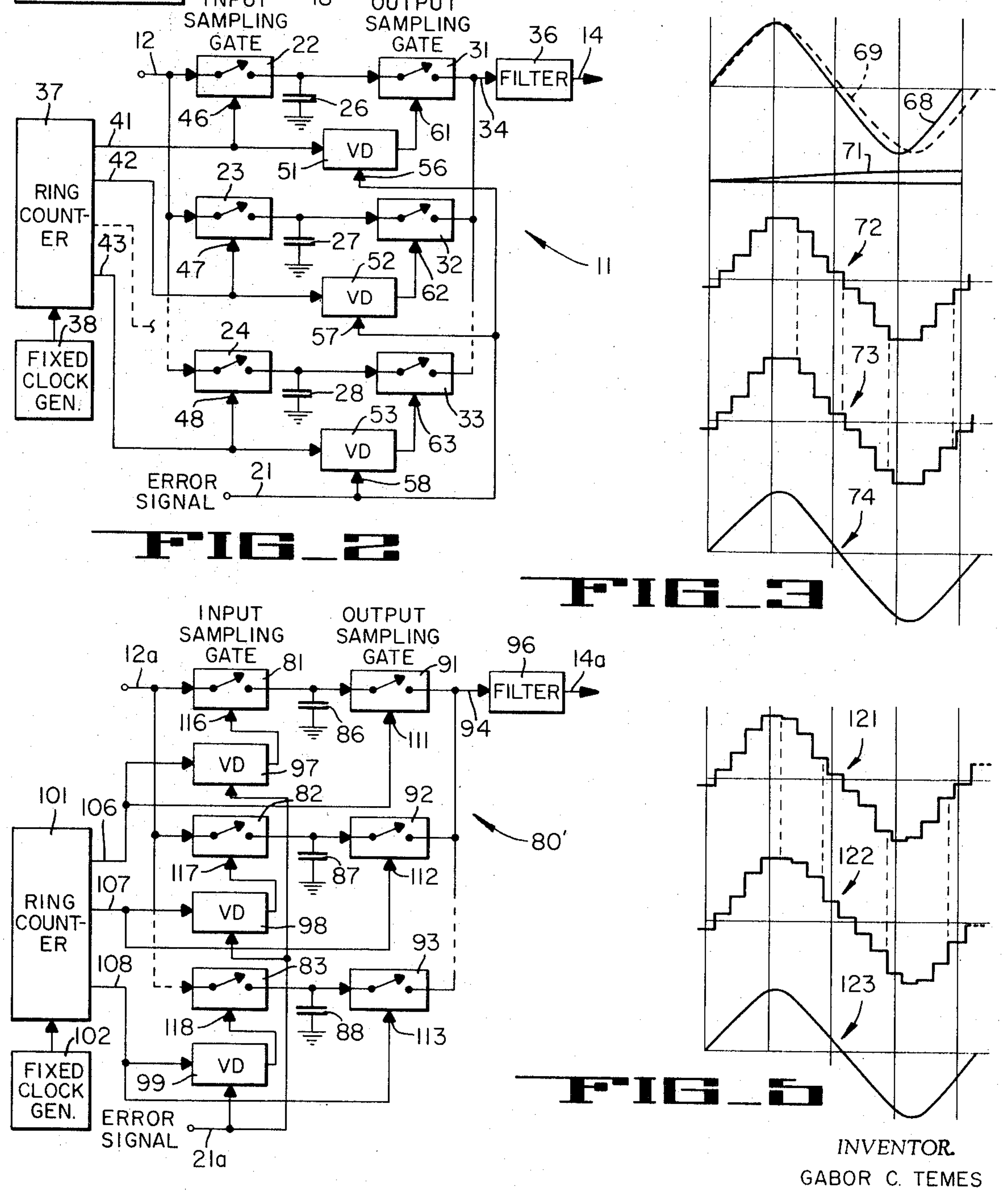
FIG. 2 is a diagram illustrating a circuit arrangement of an invention related to the present invention but claimed in another application as explained herein.
FIG. 3 is a plurality of graphs illustrating various waveforms occurring during operation of the network of FIG. 2.
FIG. 4 is a diagram illustrating the specific network and arrangement of components forming the claimed subject matter of this application.
FIG. 5 is a plurality of graphs showing various waveforms occurring in the circuit arrangement of FIG. 4 during operation thereof.

The circuit for and the method of providing an electronically controlled variable signal delay which I have invented are described herein in connection with FIGS. 4 and 5. However, before discussing my invention is detail, reference is made to FIGS. 2 and 3 which illustrate an earlier invention made by Sidney S. C. Chao and Donald E. Morgan, forming the claimed subject matter of U.S. application, 854,625 filed Sept. 2, 1969, which has been assigned to the assignee of the present application. Due to similarity features and design considerations, a discussion of the circuit shown by FIG. 2 will afford a comparison basis for a better understanding of my claimed invention.

Network 11 as shown in FIG. 2 comprises a plurality of input sampling gates 22, 23, and 24, each having an input jointly connected to line 12 for receiving the playback information signal from transport 13. A corresponding plurality of storage devices, in this instance taking the form of capacitors 26, 27 and 28, are each individually connected to receive the output of a separate one of gates 22—24 for storing the instantaneous magnitude of the information signal occurring upon operation of an associated gate. Each of capacitors 26—28 is also connected to the input of one of a plurality of output sampling gates 31, 32, and 33, wherein the outputs of gates 31—33 are jointly connected to a line 34. Each of output sampling gates 31—33 operates on command to pass the discrete signal magnitude stored by an associated one of capacitors 26—28 to line 34, whereupon a low-pass filter 36 serves to eliminate or attenuate unwanted high frequency signal components introduced by the switching of gates 22—24 and 31—33. The corrected time base signal is thereupon issued to line 14.

As will be seen, each of output sampling gates 31—33 is operated after a controlled time delay following operation of an associated one of input gates 22—24, such that successive levels of the information signal occurring at the sampling times of gates 22—24 are essentially delayed for a controlled time interval and then passed to line 34 where recombination and filtering restores the delayed signal information. By connecting a plurality of associated input gates, storage means and output gates in a parallel array as shown, and operating these gates in a predetermined sequence, it is possible to achieve significant delay times without detracting from the fidelity of the delayed signal information. Briefly, this advantage follows from the ability of the circuit to sample the input information signal at a rapid rate and at the same time store each sample signal lever for a duration greater than the period defined by the sampling frequency. The number of parallel stages thus employed, proportionately expands the time delay capability of the network while at the same time maintaining a high input sampling rate necessary for preserving the information carried by the signal.

Input sampling gates 22—24 are driven in sequence and at a constant periodic rate by means of a commutator like device, in this instance taking the form of a ring counter 37 and fixed clock generator 38. Generator 38 issues a train of pulses of fixed time spacing which function to drive counter 37 continuously through its successive counting states.

Ring counter 37 is connected by means of connections 41, 42 and 43 to control inputs 46, 47 and 48 of input sampling gates 22—24 respectively. Each of connections 41, 42 and 43 from counter 37 are also extended to voltage control variable delay units 51, 52 and 53. Output sampling gates 31, 32 and 33 have their control inputs 61, 62 and 63 connected respectively to the outputs of delay units 51, 52 and 53.

FIG. 3 shows an input information signal waveform 68 (solid line) and the desired or time base corrected information signal waveform 69. The error signal referred to above in connection with FIG. 1 is shown as waveform 71 in FIG. 3.

The staircase like waveform 72 represents the voltage observed across one of the storage capacitors, such as capacitor 26 of network 11, whereby it is observed that upon each successive and periodic operation of the corresponding input sampling gate, gate 22 in this instance, the change in the information signal causes a new voltage level to be assumed by the capacitor. As output sampling gate 31 is operated at an increasingly slower frequency relative to operation of input sampling gate 22, due to the increasing error waveform 71, the output of output sampling gate 31 issues a staircase waveform 73 having an increasingly shifted phase relative to waveform 72. Moreover, as this shift in phase is in accordance with the amount or magnitude of error waveform 71, waveform 73 is brought into phase correspondence with the desired or corrected time base information signal waveform 69.

For simplicity, FIG. 3 illustrates by means of waveforms 72 and 73 only the staircase signals associated with one parallel section or stage of network 11. It will be appreciated that, when all of the staircase waveforms from output sampling gates 31, 32, and 33 are combined at line 34, an exceedingly refined waveform is obtained. Subsequent filtering by low-pass filter 36 thereupon results in a smooth function shown by waveform 74 having the proper time base.

Furthermore, it will be observed from FIGS. 2 and 3 that the maximum amount of delay achievable by network 11 is not absolutely limited by the sampling rate. If it is desired to increase the permissible time delay, it is merely necessary to add additional parallel sections, each consisting of an input sampling gate, a storage capacitor, an output sampling gate, and a variable delay unit whereby the additional delay is afforded by the increased period between successive operations of any given one of the parallel sections. The actual sampling rate of the input information signal remains the same. In determining the appropriate number of such parallel stages for a given design application, the following considerations are required. The sampling rate of the information signal, that is the rate of which sequential operation of input sampling gates 22—24 occurs, should be at least twice the bandwidth of the information signal and preferably three times the value of such bandwidth. Furthermore, the time period between successive actuations of any given one of the input sampling gates must be sufficient to accommodate the maximum desired delay of the information signal. Accordingly, the following formula may be employed:

$$N = Tp\text{—}p \text{ (times) } W \text{ (times) } n$$

where $N$ =the number of parallel sections of network 11, $Tp$ — $p$ =the range of time base error (peak-to-peak value), $W$ =the bandwidth of the information signal and $n$ =the sampling rate factor (multiplied with the information signal bandwidth for determining the sampling rate) which as noted above must be at least 2 and preferably 3 or greater.

Now, the particular circuit arrangement and method which I have invented is shown by network **11*a* of FIG. 4. With reference to FIG. 4, delay network 11*a* is shown having resultant delay capabilities similar to that of network 11 and utilizing the same basic components as found therein, but having an operating sequence uniquely at variance with the above-described network. Particularly, in the circuit of FIG. 4, the input sampling gates are sequentially operated in accordance with a variable delay provided by the error signal, whereas the output sampling gates are actuated at a constant periodic sequential rate. Thus, network 11 of FIG. 2 may be considered a constant sampling-variable hold circuit while network 11*a*** of FIG. 4 takes the form of a variable sampling-constant hold circuit.

As in the case of network 11, network **11*a* is comprised of a plurality of input sampling gates 81, 82 and 83, each having an output coupled to an associated storage capacitor, in this instance being provided by capacitors 86, 87, and 88. To retrieve the stored signal information from capacitors 86—88, a corresponding plurality of output sampling gates 91, 92, and 93 are provided having their respective inputs coupled to associated capacitors and with their outputs jointly connected to a line 94. A low-pass filter 96 attenuates the high frequency components of the combined output signals appearing on line 94 and issues the time base corrected information signal to a line 14*a*, corresponding to line 14** of FIG. 1.

The voltage control variable delay units, in this instance provided by units 97, 98, and 99, are connected to introduce a control delay between the associated output connections of a counter 101 and each of input sampling gates 81—83, while output sampling gates 91—93 are actuated directly in response to ring counter 101. Thus, counter 101 in response to fixed clock generator 102 cycles through each of its counting states issuing trigger pulses at output connections 106, 107, and 108, which are fed to control inputs 111, 112, and 113 of respective output sampling gates 91—93 for operating these gates in sequence and at constant period intervals. Counter output connections 106—108 are also extended to the respective inputs of delay units 97—99 to provide a controlled delay between the occurrence of a trigger pulse on one of the counter output connections and an associated one of control inputs 116, 117 and 118, of input sampling gates 81—83.

With reference to FIGS. 4 and 5, network 11*a* operates in response to an information signal received at an input line 12*a* (corresponding to line 12 and FIG. 1) and an error signal applied to line 21*a* (corresponding to line 21 of FIG. 1) to issue the corrected time base information signal at output line 14*a*. To facilitate comparisons between the operations of networks 11 and 11*a*, the waveforms shown by FIG. 5 are those occurring during operation of network 11*a* in response to the same input information signal waveform 68 and error signal 71 discussed above in connection with FIG. 3. It is noted that the waveforms of FIGS. 3 and 5 are drawn to the same horizontal time base. Thus, the waveforms of FIG. 5 are the result of an information signal waveform 68 applied to line 12*a* of network 11*a* AND AN ERROR SIGNAL 71 applied to line 21 *a* of network 11*a*. As a result, a staircase waveform of discrete voltage steps appears across each of storage capacitors 86—88, wherein a waveform 121 for one of the capacitors is illustrated by FIG. 5. Assuming that waveform 121 represents the discrete voltage levels stored by capacitor 86, it is noted that each such voltage level is held for a period between successive operations of input sampling gate 81. Furthermore, the time interval between such successive operations of gate 81 is not constant but, on the contrary, tends to vary with time. This is by virtue of the variable delay introduced by delay unit 97 in accordance with time variable changes in the error signal applied to line 21*a*. Thus, in this circuit, the instantaneous sampling rate at the input sampling gates is continuously variable in response to the error signal. The staircase voltage waveform 121 provided across capacitor 86 is retrieved by the constant periodic actuation of output sampling gate 91, where the signal provided by such operations appears on line 94 and is shown as waveform 122 in FIG. 5. By this operation it is observed that actuation of each output sampling gate 91—93 precedes actuation of the associated input sampling gate 81—83 whereas the reverse of this sequence is followed by network 11. Nevertheless, the desired relative timing operation between the associated input and output sampling gates is achieved such that waveform 122 exhibits the appropriate increasing phase shift in accordance with error signal 71. This phase modification provides for correcting the time base error between the input information signal waveform 68 and the desired information signal waveform 69 of FIG. 3. As in the case of FIG. 3, FIG. 5 has been simplified by showing only the stored and output staircase waveforms associated with one parallel section of network 11*a*. In actual operation, each parallel section of network 11*a* issues a staircase waveform to line 94, each such waveform corresponding to that of waveform 122 shown in FIG. 5 but offset therefrom in accordance with the timing sequence provided by generator 102 and counter 101. When all of these waveforms are combined at line 94 and suitably filtered by low-pass filter 96, a waveform 123 is issued at output line 14*a*. It will be noted that waveform 123 corresponds to waveform 74 of FIG. 3, both of which contain the original information and have a time base corrected to match that of the reference signal from generator 19 of FIG. 1. The same design considerations apply to network 11*a* as discussed above, in order to determine the appropriate number of parallel network sections to be employed.

In constructing the variable delay networks of FIGS. 2 and 4, it will be appreciated by those skilled in the art that a variety of electrical and electronic components are available for performing the functions disclosed herein. For example, input sampling gates 22—24 and 81—83 and output sampling gates 31—33 and 111—113 may be provided by high-speed transistor switches. It may be desirable in some applications to use transistor switches of the field effect class in order to obtain advantageous impedance isolation for preserving the stored charge on capacitors 26—28 and 86—88 during the storage modes thereof.

Also, it will be observed that capacitors 26—28 and 86—88 serve in a broad sense to provide a means for storing or holding sampled signal levels. Thus, such storage means may take the form of magnetic core storage elements, as will be recognized to those skilled in this art.

Voltage control variable delay units 51—53 and 97—99 may be conveniently provided by transistorized monostable multivibrators wherein the duration of their unstable states may be controlled by an external voltage, in this instance by an error signal applied to lines 21 and 21*a*.

I claim:

1. An electrically controlled time variable signal delay network wherein an input signal is to be selectively delayed in accordance with the amplitude of a time variable control signal, comprising;

a plurality of input gates adapted for jointly receiving the input signal to be delayed, said input gates each operable on command to sample the instantaneous magnitude of such input signal;

a corresponding plurality of electrical storage means, each individually connected to an associated one of said input gates for storing the signal magnitudes provided by operation of an associated said input gate;

a corresponding plurality of output gates, each individually connected to an associated one of said storage means and each being operable on command o sample the signal magnitude carried by an associated said storage means;

generator means having a plurality of output connections each connected to and for sequentially and periodically operating said output gates;

delay means having a plurality of delay devices each connected from a separate one of said output connections to and for operating a separate one of said input gates such that said input gates are operated in response to an electrically controlled delay interval following actuation of an associated said output gate, said delay devices each having a control input adapted for receiving said control signal for selectively delaying operation of said input gates in accordance with the instantaneous amplitude of said control signal; and signal summing means jointly connected to said output gates summing the signals provided by said output gate sampling operations.